United States Patent [19]
Libit

[11] Patent Number: 4,459,339
[45] Date of Patent: Jul. 10, 1984

[54] FLAMEPROOFING

[76] Inventor: Lawrence Libit, 1 Park Newport Bldg. 2240, Apt. 215, Newport Beach, Calif. 92660

[21] Appl. No.: 322,984

[22] Filed: Nov. 19, 1981

[51] Int. Cl.³ .............................................. B05D 3/06
[52] U.S. Cl. ........................... 428/514; 204/159.22; 427/53.1; 427/54.1; 428/541; 428/921
[58] Field of Search ............... 427/44, 54.1, 397, 53.1; 52/518; 204/159.22; 428/511, 514, 541, 921

[56] References Cited
U.S. PATENT DOCUMENTS

| | | | |
|---|---|---|---|
| 3,047,532 | 7/1962 | D'Alelio | 204/159.15 |
| 3,056,760 | 10/1962 | D'Alelio | 204/159.15 |
| 3,619,393 | 11/1971 | Stahly | 204/159.15 |
| 3,665,667 | 5/1972 | Oberley et al. | 52/518 |
| 3,719,728 | 3/1973 | Miranda | 204/159.15 |
| 3,906,136 | 9/1975 | Weil | 427/54.1 |
| 3,912,837 | 10/1975 | Pesek et al. | 427/44 |
| 4,073,835 | 2/1978 | Otsuki et al. | 264/22 |

Primary Examiner—John H. Newsome
Attorney, Agent, or Firm—Sidney Wallenstein

[57] ABSTRACT

Flameproofing of various combustible materials, particularly wood-shake shingles used in roofing of houses and tar paper sheets, by coating and impregnating such combustible materials with a liquid composition comprising a fire or flame retardant, exemplified by phosphorus- and halogen-containing organic compounds, a liquid curable organo binder, a curing agent or, more particularly, a photoiniator. After the coating and/or impregnation, curing is effected by either sunlight or ultraviolet light or ionizing radiation.

5 Claims, No Drawings

FLAMEPROOFING

My invention relates particularly to fireproofing and flameproofing especially of wood-shake shingles and tar paper sheets, or sheet stocks, which are used for roofing of houses and other building structures. It is common practice in particular areas, for instance, in the State of California, to roof homes with wood-shake shingles. When a fire breaks out in one of such homes, particularly in a closely packed district or area of homes the roofs of which utilize wood-shake shingles, the sparks readily attach themselves to the roofs of adjoining homes resulting in the rapid spread of the fire and the complete destruction of neighborhoods. In a recent fire in an apartment complex in which the roofing was made of wood-shake shingles, the entire complex was destroyed by what started out as a small fire in a laundry room and which spread to one roof, and then from roof to roof. So serious is this problem that, in certain States, laws prohibit the use of wood-shake shingles in any new homes or other structures.

Fireproofing and flameproofing compositions have long been known to the art, including those which have been specifically suggested for use in the preparation of flameproofed or flame-resistant roofing materials. Illustrative thereof is Canadian Pat. No. 448,535 which discloses various prior art compositions which have heretofore been suggested for producing fire resistant articles among which are flame resistant roofing materials. In the invention of said Canadian patent, for instance, roofing sheets, such as tar paper, or other roofing material, are coated with a bituminous or resinous material, such as bitumens or sulfated or phosphated petroleum hydrocarbons, in a liquid vehicle, which may be a liquid resinous material, the coating having the property, when exposed to flame, of puffing and coking with the formation of an intumesced difficultly combustible coky mass consisting essentially of a bitumen and a sulfated or phosphated derivative which, as noted above, is characterized by puffing and becoming highly intumescent when exposed to flame.

British Pat. No. 874,762 discloses, among other flameproofing coating compositions, those which utilize binders in the form of copolymers of vinyl chloride and vinylidene chloride, chlorinated polyethylene and polyacrylates, plus ammonium salts which produce a foamed layer when heated; and, also, flameproofing coating compositions comprising aqueous polyvinyl ester dispersions which are not coagulated by electrolytes and which contain flameproofing agents in the form of ammonium salts which produce a foamed layer when heated.

Numerous U.S. patents disclose various flameproofing agents in the form of phosphorus-containing and phosphorus-halogen-containing organic compounds (hereafter, for convenience, "phosphates"), illustrative of which are U.S. Pat. Nos. 3,089,893; 3,132,169; 3,192,242; 3,265,774; 3,306,937; 3,344,112; 3,403,118; and 3,801,542. These patents, generally speaking, disclose various types of such flameproofing agents and their use for the flameproofing of various polymeric materials in which they may be incorporated such as, for instance, urea-formaldehyde resins, epoxy resins, polyester resins, acrylate and methacrylate resins, polyurethanes, polystyrene, and the like. Also disclosed in certain of these patents, for instance, U.S. Pat. Nos. 3,132,169; 3,192,242; 3,306,937; and 3,344,112, is the use of the said phosphates as additions for products made of cotton, linen, wood and wood pulp, pressed board, etc.

So far as I am aware, no fully satisfactory solution to the problem, particularly of flameproofing wood-shake shingle roofing, has been met by anything marketed or offered commercially, despite the seriousness of the problem. In accordance with my present invention, this problem is effectively met in a manner which is economically and commercially feasible.

The flameproofing compositions of my invention utilize, particularly, flameproofing agents or fire retardants which are organic compounds which are of the type which contain phosphorus, and, particularly, those organic compounds which contain both phosphorus and halogen, notably chlorine or bromine. Many of them are, per se, well known to the art, are disclosed in various of the foregoing patents, the disclosures with respect to which are incorporated herein by reference, and are known to possess flameproofing or flame-retardant properties, and various of which are disclosed in numbers of the foregoing listed patents. Typical of such flameproofing agents are bis (2,3-dibromopropyl) phosphate and others which are sold or offered for sale on the commercial market and are identified by particular trademarks, illustrative of which are "PHOSGARD CR-22" and "PHOSGARD XC-2000L" (Monsanto Company). "PHOSGARD CR-22", for instance, is a U.L. approved fire retardant viscous liquid which is stated to have no flash point or fire point. Its adherence characteristics to the surfaces of various materials is quite poor and it tends relatively readily, when applied to surfaces of different materials, to drip off therefrom.

In accordance with one aspect of my present invention, "PHOSGARD CR-22", or a similar or equivalent flameproofing material or materials or compound or compounds, is formed or incorporated into compositions which comprise photo-curable binders which have good adhesion to wood or similar surfaces. Of especial value, and representing important, though limited, embodiments of binders, are acrylic or methacrylic esters, an especially useful embodiment of which is 2-hydroxyethyl methacrylate (commonly known as HEMA), together with a photoinitiator of which highly suitable examples are 2,2-diethoxyacetophenone and 2,2-diethoxy acetylphenone, products sold under the trademarks "IRGACURE 651" and "QUANTA-CURE".

In place of 2-hydroxyethyl methacrylate, other acrylic or methacrylic derivatives, including esters and amides of acrylic acid and methacrylic acid, can be utilized which are photo-curable, as well as non-acrylic or non-methacrylic based binders. Illustrative of such photo-curable materials are, particularly, glycerol methacrylate and 2-hydroxypropyl methacrylate; and others are methacrylic amide, chloroacrylamide, butyl acrylate, methyl methacrylate, and cyclohexyl methacrylate. In general, in the broader aspects of the present invention, flameproofing or flame-retardant agents can be used which can be converted to substantially homogeneous solutions or emulsions in compositions of the character or nature disclosed pursuant to the present invention.

While 2,2-diethoxyacetophenone has been found to be particularly satisfactory as a photoinitiator for use in the flameproofing compositions of my invention, other photoinitiators can be used of the type which are acetophenone derivatives or of entirely different chemical structure. Typical or illustrative examples of such photoinitiators, as such, are disclosed, for instance, in U.S. Pat. Nos. 3,957,918 and 4,189,365, as well as in many other U.S. patents.

It is also especially desirable, although optional, to include in the flameproofing compositions of the present invention, cross-linking agents typical or illustrative of which are vinyl-substituted hydrocarbons and/or unsaturated polyesters such as α-vinylnaphthalene, β-vinylnaphthalene, styrene, α-methyl styrene, α-chlorostyrene, vinyl acetate, ethyl vinyl ketone, and vinyl ethyl ether. Particularly satisfactory are pentaerythritol triacrylate, trimethylol trimethacrylate and diamylethylene glycol dimethacrylate. In general, di- and tri-functional acrylates and methacrylates are especially desirable as cross-linking agents.

It is important also, to prevent premature gelling of the flameproofing compositions of the present invention, to incorporate a stabilizer into the compositions, illustrative examples of which are hydroquinone and butylated hydroxy toluene, but other stabilizers can be used in place thereof. Hydroquinone is particularly satisfactory. Proportions are variable, extending, generally, from an effective amount up to about 2% or 3% by weight of the 2-hydroxyethyl methacrylate or equivalent acrylic or methacrylic derivatives.

The proportions of the ingredients utilized in the flameproofing compositions of my invention are variable within reasonable limits. The flameproofing compound or compounds constitute an effective amount, by weight, and commonly will comprise the distinctly major ingredient or ingredients of the final flameproofing compositions although this is not required in all instances; the binder or binders constitute appreciable but, usually, distinctly minor ingredients although, again, this is not necessarily so and the binder may sometimes exceed the amount of the flameproofing agent; and the photoinitiator or initiators distinctly in small proportions of the ingredients, e.g. up to about 20% of the photo-curable binder. In at least most cases, the flameproofing compositions of the present invention, which are in the form of pourable or sprayable liquids, will contain the following ingredients in substantially the following parts by weight. It is important, and it is to be understood, that the selected ingredients must be compatible with each other to form an essentially homogeneous liquid composition, which, in its particularly advantageous embodiments, is also clear even though it may be colored. It may also be noted that the particularly advantageous flameproofing compositions of the present invention, even though they contain a relatively high content of solids, possess a relatively low viscosity so that when applied, for instance, to wood-shake shingles, they penetrate to an appreciable extent below the surfaces of said shingles. The compositions can be applied initially to the wood-shake shingles without any activator, or there may be initially applied to the wood-shake shingles a solution of the PHOSGARD in a volatile solvent, for instance, methanol, after which the flameproofing compositions of my invention are applied.

| | Parts |
|---|---|
| Flameproofing agent or agents, e.g. PHOSGARD CR-22 | 60-100 |
| Binder (including or not including cross-linking agent) | 10-25 |
| Photoinitiator An effective amount up to about | 10% to 20% by weight of the 2-hydroxyethyl meth- |
| | -continued |
| | Parts |
| Cross-linking agent (where used) An effective amount up to about | acrylate or the like. 100% by weight of the 2-hydroxyethyl methacrylate. |
| Stabilizer (e.g. hydroquinone) | Up to about 2% by weight of the hydroxyethyl methacrylate or the like. |

In certain cases, it may be desirable, preliminarily, to subject the wood-shake shingles, prior to the application thereto of the flameproofing compositions of the present invention, to a soak of said shingles in an aqueous solution of ammonium hydrogen phosphate, or, as noted above, in solutions of the PHOSGARD in an organic solvent, e.g. ethanol, say 50% or higher solutions of the PHOSGARD in the organic solvent. This soaking procedure is, per se, known to the art as imparting some flameproofing to materials and no novelty is claimed therein per se or as such. It has the objection of leaking out of the materials soaked therein. When used as a preliminary step in the flameproofing of wood-shake shingles wherein the flameproofing compositions of the present invention are used, the leaking out tendency appears to be reduced.

The following examples are illustrative but in no way limitative of the scope of my invention since various changes may be made within the guiding principles and teaching of my invention disclosed herein without departing therefrom. All parts listed are by weight.

| EXAMPLE I | Parts |
|---|---|
| PHOSGARD CR-22 | 100 |
| HEMA (2-hydroxyethylmethacrylate) | 18 |
| PETA (Pentaerythritol triacrylate) | 3 |
| IRGACURE 651 | 2 |
| HYDROQUINONE | 0.2 |

| EXAMPLE II | Parts |
|---|---|
| PHOSGARD XC-2000L | 100 |
| HEMA | 16 |
| PETA | 4 |
| QUANTACURE | 2 |
| HYDROQUINONE | 0.3 |

While, as previously described, the invention has its present greatest utility in connection with the flameproofing of wood-shake shingles, it is also useful in the treatment of tar sheets. In this case, the flameproofing compositions are applied by depositing a relatively thin layer or coating, for instance, of a thickness in the approximate range of about 5 to about 10 mils, more or less, on a previously tarred Mylar or paper or like backing and then cured.

In use of the foregoing compositions, where they are to be shipped or stored for some reasonably appreciable period of time prior to actual usage, it is desirable that they be prepared without the photoinitiator being added thereto. When ready to be used, say, for the coating and impregnation of wood-shake shingles, the compositions, without the photoinitiator, are desirably introduced into a sprayer device and then the requisite amount of the photoinitiator, desirably in the form of a solution in an inert organic solvent, for instance, acetone, is added to the composition previously introduced into the sprayer device. The mixture is shaken to achieve homogeneity and then sprayed on the roofs as well as on any adjacent wood members such as two-by-fours, and particularly of new construction. After about 3 to 10 minutes, in the usual case, the low viscosity spray cures to a fire retardant coating by exposure to sunlight. The application of the compositions of my invention can, broadly speaking, be applied to the wood-shake shingles either before or after forming the roofs on houses or the like, but is most advantageously applied to the roof after it has been formed with the wood-shake shingles.

The flameproofing compositions made in accordance with my invention, absent the photoinitiator, will, in general, undergo no curing or essentially no curing in the dark, and are quite stable on exposure to sunlight or ultraviolet light or irradiation. A thin film cures to a rubbery clear coating which possesses good flexibility to tolerate wood-shake shingle variations.

It will be understood that, while, in the practice of certain aspects of my present invention, curing of the compositions after application, say, to the wood-shake shingles or tar paper is especially desirably effected by means of ultraviolet light or by ionizing radiation, and by the incorporation into the compositions of photoinitiators, I do not claim my novelty broadly in the use of photoinitiators in polymerizable compositions coupled with effecting the polymerization of curable monomeric-containing compositions with ultraviolet light or ionizing radiation. This is disclosed, for instance, in such U.S. Patents as Nos. 3,957,918 and 4,189,365, which, however, have nothing to do with or relating to the overcoming of problems of flammability, espcially in wood-shake shingle roofing.

I claim:

1. A flameproofing composition having particular utility for the flameproofing of wood-shake shingles which comprises a substantially homogeneous liquid composition containing an effective proportion, by weight, of a flameproofing agent, a photo-curable binder, a minor proportion of a photoinitiator, and a minor proportion of a stabilizer, in which the flameproofing agent constitutes a major proportion of the flameproofing composition and comprises an organic compound containing phosphorus and a halogen selected from the class of chlorine and bromine and in which the ingredients are present in approximately the following parts by weight:

|  | Parts |
|---|---|
| Flameproofing agent | 60–100 |
| Binder | 10–25 |
| Photoinitiator | An effective amount up to 20% of the photo-curable binder |
| Stabilizer | An effective amount up to 3% of the photo-curable binder |

2. In a method of flameproofing wood-shake shingles, the steps which comprise impregnating said wood-shake shingles with the flameproofing composition of claim 1, and then effecting photocuring of said composition.

3. Wood-shake shingles being coated and impregnated with a flameproofing composition comprising a substantially homogenous liquid composition in which the flameproofing composition contains the following ingredients in approximately the following parts by weight:

|  | Parts |
|---|---|
| PHOSGARD CR-22 | 100 |
| 2-hydroxyethyl methacrylate | 18 |
| Pentaerythritol triacrylate | 3 |
| Photoinitiator | 2 |
| Hydroquinone | 0.2 |

4. Wood-shake shingles according to claim 3, in which photocuring is effected by sunlight.

5. Wood-shake shingles according to claim 3, in which photocuring is effected by untraviolet light.

* * * * *